(12) United States Patent
Fleischmann et al.

(10) Patent No.: US 8,429,611 B2
(45) Date of Patent: *Apr. 23, 2013

(54) METHOD AND SYSTEM FOR GENERATING A SOURCE CODE FOR A COMPUTER PROGRAM

(75) Inventors: Albert Fleischmann, Pfaffenhofen (DE); Nils Meyer, Pfaffenhofen (DE)

(73) Assignee: Metasonic AG, Pfaffenhofen (DE)

( * ) Notice: Subject to any disclaimer, the term of this patent is extended or adjusted under 35 U.S.C. 154(b) by 88 days.

This patent is subject to a terminal disclaimer.

(21) Appl. No.: 12/946,406

(22) Filed: Nov. 15, 2010

(65) Prior Publication Data

US 2011/0113403 A1 May 12, 2011

Related U.S. Application Data

(63) Continuation of application No. 11/112,966, filed on Apr. 22, 2005, now Pat. No. 7,861,221.

(30) Foreign Application Priority Data

Apr. 23, 2004 (DE) .......................... 10 2004 019 958

(51) Int. Cl.
*G06F 9/44* (2006.01)
(52) U.S. Cl.
USPC ............ 717/122; 717/106; 717/116; 717/137
(58) Field of Classification Search .................. None
See application file for complete search history.

(56) References Cited

U.S. PATENT DOCUMENTS

| 5,524,253 | A | 6/1996 | Pham et al. |
| 5,625,580 | A | 4/1997 | Read et al. |
| 7,861,221 | B2 * | 12/2010 | Fleischmann et al. ........ 717/109 |
| 2002/0186245 | A1 | 12/2002 | Chandhoke et al. |
| 2004/0107414 | A1 | 6/2004 | Bronicki et al. |

FOREIGN PATENT DOCUMENTS

| DE | 10008632 B4 | 9/2001 |
| WO | 98/39698 | 9/1998 |

OTHER PUBLICATIONS

Ossher et al., "Subject-Oriented Programming: Supporting Decentralized Development of Objects," 7th IMB Conference on Object-Oriented Technology, Jul. 1994, pp. 1-13.

(Continued)

*Primary Examiner* — Chuck Kendall
(74) *Attorney, Agent, or Firm* — Rankin, Hill & Clark LLP

(57) ABSTRACT

A method for the generation of a source code for a computer program for the execution or simulation of a complex process in which a multiplicity of subjects communicate with one another. In this method, the processes are described, the description of the processes is stored in a process file, and with the aid of the process file a source code for a computer program is generated, with a separate source code file being generated for each subject. Through the provision of a source code file for each subject, a complex process may be easily and therefore automatically split into several sub-programs, the source code files, which may be generated automatically. In this way it is possible to generate automatically a computer program for a very complex process. A further benefit of the method according to the invention is that it may be executed after automatic generation, i.e. it may be validated by an execution immediately after generation.

20 Claims, 18 Drawing Sheets

OTHER PUBLICATIONS

Figure 1:
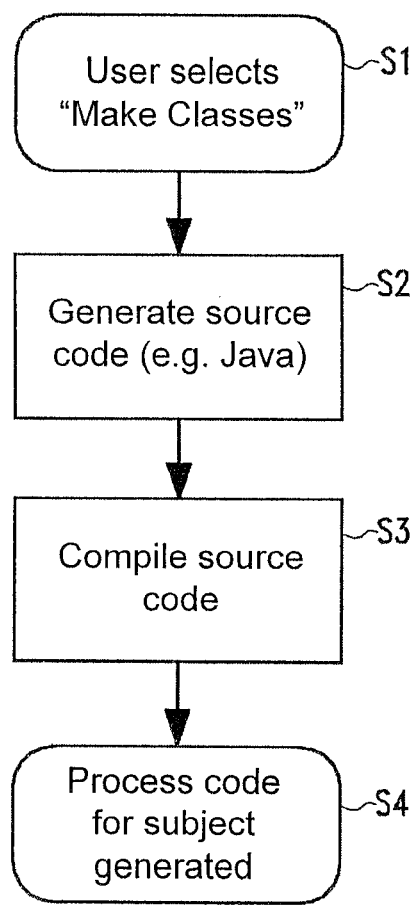

Fleischmann, "Presseinformation: jPass! macht Prozesse lebendig, Mar. 8, 2004." press release dated Mar. 8, 2004, three pages.
Summary of "Presseinformation: jPass! macht Prozesse lebendig, Mar. 8, 2004," one page.
Fleischmann, "Distributed Systems Software Design and Implementation," Springer-Verlag, pp. 263-292.
Summary of DE 10008632 B4, two pages.
Fleischmann et al., "Experience processes, before spending money." dated Jan. 5, 2004, 34 pages.
Chun Ouyang, Wil M.P. van der Aalst, Marlon Dumas, and Arthur H.M. ter Hofstede, Translating BPMN to BPELM, 22 pages.
Dr. Herbert Fischer, "Softwaretool-Labor", Mar. 3, 2005, 38 pages.
Dr. Thomas Allweyer, "Missing Links—Ein BPMS alleine macht noch kein Prozessmanagement", Nov. 9, 2006, 3 pages.
William Harrison and Harold Ossher, "Subject-Oriented Programming (A Critique of Pure Objects)", Oct. 28, 1993, pp. 411-428, No. 10, ACM Sigplan Notices, New York.
CSC444F Software Engineering I, Tutorial Assignment 2, Sep. 2001, 3 pages.

* cited by examiner

Generate process code

Program sequence of a generated subject (without refinements)

Process file (example)

Subjects
    Subject 1
        Name 1
        Host
        Start function 1.1
        Functions
            Function 1.1
                Name
                Type Receive
            Function 1.2
                Name
                Type Send
        Function transitions
            Transition 1.1
                From function 1.1
                To function 1.2
                Message 1
            Transition 1.2
                From function 1.2
                To function 1.1
                Message 1
    Subject 2
        Name 2
        Host
        Start function 2.1
        Functions
            Function 2.1
                Name
                Type Send
            Function 2.2
                Name
                Type Receive
        Function transitions
            Transition 2.1
                From function 2.1
                To function 2.2
                Message 1
            Transition 2.2
                From function 2.2
                To function 2.1
                Message 1
    Messages
        Message 1
            Name 1
            From subject 2
            To subject 1
        Message 2
            Name 2
            From subject 1
            To subject 2

Fig.5

This XML file does not appear to have any style information associated with it. The document tree is shown below.

---

- <process id="process1081921968350" name="Automatic_Log_in.jpp" version="1.5">
    <comment/>
  - <subjects>
        ...
      - <subject id="subject1081921986090" name "OBU_Running" position_type="internal" x="216" y="260" is_dynamic="no" cluster="no" type="pure java" status="done" startstate="state1081922975140">
            <developer/>
            <host/>
            <port/>
            <comment/>
            <version/>
            <variables/>
            <constructor/>
          - <states>
              - <state id="state1081922975140" name= "Parameter input" x="165" y="9" interactive="yes" startstate="yes" type="RECEIVE">
                    <comment/>
                    <image/>
                    <refinement/>
                </state>
              - <state id="state1081923036820" name= "Start" x="166" y="103" interactive="yes" type="RECEIVE">
                    <comment/>
                    <image/>
                    <refinement/>
                </state>
              - <state id="state1081923058730" name="Finish" x="162" y="196" interactive="yes" type="RECEIVE">
                    <comment/>
                    <image/>
                    <refinement/>
                </state>
              - <state id="state1081923105200" name= "Running Data" x="164" y="289" interactive="yes" type="SEND">
                    <comment/>
                    <image/>

```xml
    <refinement/>
  </state>
</states>
<transitions>
  <transition id="transition1081923074000" timeout="1000"
    source="state1081922975140" destination="state1081923036820">
    <label>
      <fixpoint x="165" y="62"/>
      <text>(From Truck Driver)</text>
      <text> Truck_Data </text>
    </label>
    <type>RECEIVE</type>
    <event>RECEIVE</event>
    <event_subject> Truck Driver </event_subject>
    <event_type> Truck_Data </event_type>
    <transitionpoint x="198" y="52"/>
    <transitionpoint x="200" y="109"/>
    <comment/>
    <refinement/>
  </transition>
  <transition id="transition1081923085920" timeout="1000"
    source="state1081923036820" destination="state1081923058730">
    <label>
      <fixpoint x="160" y="156"/>
      <text>(from OBU_Position)</text>
      <text> Start Toll Section </text>
    </label>
    <type>RECEIVE</type>
    <event>RECEIVE</event>
    <event_subject>OBU_Position</event_subject>
    <event_type> Start Toll Section </event_type>
    <transitionpoint x="200" y="146"/>
    <transitionpoint x="200" y="192"/>
    <comment/>
    <refinement/>
  </transition>
  <transition id="transition1081923136400" timeout="1000"
    source="state1081923058730" destination="state1081923105200">
    <label>
      <fixpoint x="158" y="252"/>
      <text>(from OBU_Position)</text>
      <text>Finish Toll Section</text>
    </label>
```

Fig.7(2 of 4)

```xml
<type>RECEIVE</type>
<event>RECEIVE</event>
<event_subject>OBU_Position</event_subject>
<event_type>Finish_Toll Section</event_type>
<transitionpoint x="198" y="239"/>
<transitionpoint x="201" y="299"/>
<comment/>
<refinement/>
</transition>
<transition id="transition1081923184620" timeout="1000"
source="state1081923105200" destination="state1081922975140">
  <label>
     <fixpoint x="200" y="350"/>
     <text> (to Toll_Collection_Center) </text>
     <text>Current_Journey Data</text>
  </label>
  <type>SEND</type>
  <event>SEND</event>
  <event_subject>Toll_Collection_Center</event_subject>
  <event_type>Current_Journey Data </event_type>
  <transitionpoint x="198" y="332"/>
  <transitionpoint x="200" y="350"/>
  <transitionpoint x="86" y="351"/>
  <transitionpoint x="87" y="36"/>
  <transitionpoint x="170" y="36"/>
  <comment/>
  <refinement/>
</transition>
<transition id="transition1081923201810" timeout="1000"
source="state1081922975140" destination="state1081923058730">
  <label>
     <fixpoint x="262" y="118"/>
     <text>(from OBU_Position)</text>
     <text> Start Toll Section </text>
  </label>
  <type>RECEIVE</type>
  <event>RECEIVE</event>
  <event_subject>OBU_Position</event_subject>
  <event_type> Start Toll Section </event_type>
  <transitionpoint x="233" y="34"/>
  <transitionpoint x="300" y="34"/>
  <transitionpoint x="301" y="207"/>
  <transitionpoint x="227" y="208"/>
```

Fig.7(3 of 4)

```xml
            <comment/>
            <refinement/>
          </transition>
        </transitions>
        <inputpool id="inputpool1081948002997" size="1000"/>
      </subject>
      ...
    </subjects>
  - <messages>
    - <message>
      - <messagetypes>
          ...
        - <messagetype id="messagetype1081922382440"
          name= "Current_Journey Data">
            <msgparam name= "Start Position" datatype=""/>
            <msgparam name= "Toll Charge" datatype=""/>
            <msgparam name= "Truck_Data" datatype=""/>
          </messagetype>
          ...
        - <messagetype id="messagetype1081922651570"
          name= "Start Toll Section" >
            <msgparam name= "Start Position" datatype=""/>
          </messagetype>
        - <messagetype id="messagetype1081922675240"
          name= "Finish Toll Section">
            <msgparam name= "Finish Position" datatype=""/>
          </messagetype>
          ...
        </messagetypes>
        ...
      </message>
      ...
    </messages>
  </process>
```

METHOD AND SYSTEM FOR GENERATING A SOURCE CODE FOR A COMPUTER PROGRAM

This application is a continuation application of U.S. application Ser. No. 11/112,966 filed Apr. 22, 2005, which claims priority to German Application No. 10 2004 019 958.2 filed Apr. 23, 2004 all of which are incorporated herein in their entirety by reference.

The invention relates to a method and system for the generation of a source code for a computer program for the execution or simulation of a process in which several subjects communicate with one another. In particular, the method according to the invention is provided for the generation of a source code for a computer program for the execution or simulation of a complex process involving a multiplicity of subjects which communicate with one another.

Methods for the automatic generation of a source code are quite well-known. For example WO 98/39698 describes a method of creating a computer program controlling a business management process, in which firstly several diagrams are produced, so that with the aid of these diagrams the computer program may be generated automatically.

A further such method is described in DE 100 08 632 B4 in which a source code is also generated automatically from special diagrams.

Using known methods for the automatic generation of a source code, computer programs may be generated automatically for both technical and business management processes. With these known methods it is however difficult to implement complex processes in a computer program. Known methods are often unable to cope with complex processes. If however the known methods are also able to generate automatically a source code for complex processes, then the source code is on the one hand very extensive and on the other hand, due to the complexity of the underlying process, often contains errors and is slow in execution.

The invention is based on the problem of creating a method and system for the generation of a source code for a computer program for the execution or simulation of a complex process, which does not have the disadvantages described above.

The problem is solved by a method with the features of claim 1 and by a system with the features of claim 13.

The invention is also based on the problem of creating a method by which a source code generated automatically for a complex process may be validated.

This problem is solved by a method with the features of claim 11.

Advantageous developments of the invention are set out in the respective dependent claims.

The method for the generation of a source code for a computer program for the execution or simulation of a process in which several subjects communicate with one another comprises the following steps:

production of a description of the process in which each subject, the communication between the subjects, and the nature of the activity of the individual subjects are defined, storage of the description of the process with the input definitions in a process file in which the diagram is described, automatic generation of a source code for a computer program, in which a separate source code file is generated for each subject and contains commands for the exchange of data with source code files of other subjects.

Through the automatic generation of a source code file for each subject, containing a source code, in which commands for the exchange of data with source code files of other subjects are contained, even complex processes may as desired be converted automatically into a source code, in a simple and structured manner. The more complex a process, the more source code files are generated by the method according to the invention, but the individual source code files themselves do not become more complex. It has been found that, in the case of complex processes with many source code files, each individual source code file communicates only with a limited number of other source code files, so that the structure of each individual source code file is therefore simple and less prone to error. The storage and management of a multiplicity of source code files requires only the provision of adequate storage capacity. No problems of principle are created here.

The source code created by the method according to the invention may either be converted by a conventional compiler into a program which is capable of running, or else be executed directly by an interpreter. The program may be executed immediately without further processing. No manual processing of the automatically generated source code is required. The source code may therefore be executed immediately.

The fact that a source code capable of execution is generated automatically from a general process description represents a significant innovation as compared with known methods.

A further advantage of the generation of a separate source code file for each subject is that the individual source code files may be executed on different computers in a network. The functions (SEND, RECEIVE) used for communication between the individual subjects are so designed that communication may also extend over a network. The method according to the invention may thus be used to generate computer programs which can be run distributed over a network, while the network may be configured in any way desired. They may be local networks (LAN), intranets or the internet, also networks with mixed topology.

According to a preferred embodiment of the invention, the source code file is provided with reference to data of the process file, so that in executing the source code, the relevant data from the process file are read out and commands are invoked on the basis of this data. By this means, the data of the process file are used for direct control of the source code. As a result of this, when the process file is compiled, a significant portion of the computer program to be executed is generated automatically, and the source code to be generated automatically may be kept very compact.

According to a further embodiment of the invention, the source code file is used to call up only three different types of function, namely SEND, RECEIVE and DO. The use of only three types of function makes the automatic generation of a source code simple, while the functions SEND and RECEIVE may be used for complete control of communication between the subjects, even when a complex process is involved.

In the method according to the invention for validating the communication of an automatically generated source code, for actions for which a source code can not automatically be generated, a request is made to the user in the automatic generation of the source code and, in the validation of the automatically generated source code, the source code is executed, with the user having to acknowledge the individual requests interactively, making certain inputs as necessary.

By this means it is possible to execute an automatically generated source code without having to supplement the source code additionally through manual programming work.

If, using this method, a source code generated in accordance with claims 1 to 10 is validated, then communication between the individual subjects and thus the correctness of the modeling of the process may be completely verified, and only for actions within a subject, which conform to the function DO referred to above, must requests to the user be made.

Figure 2:
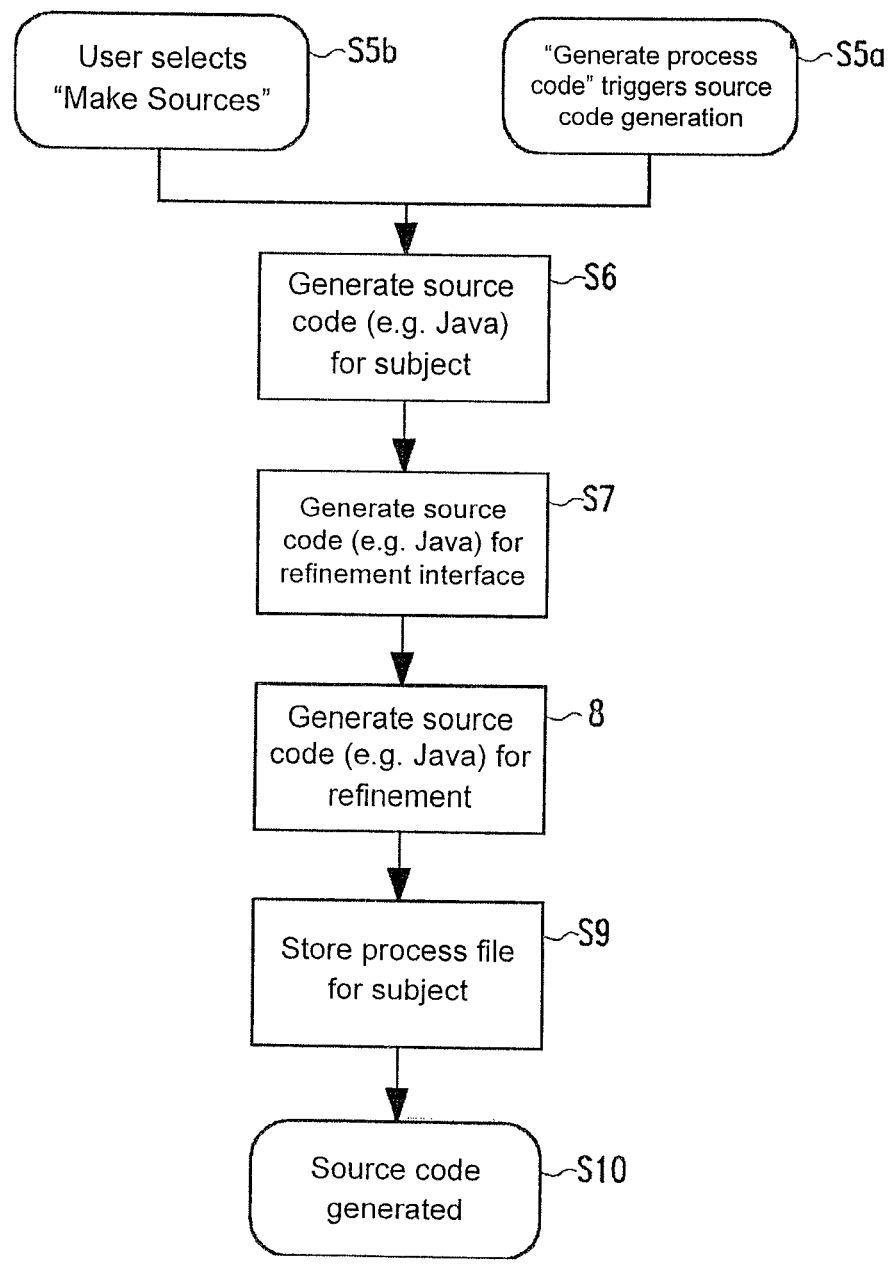
Figure 3:
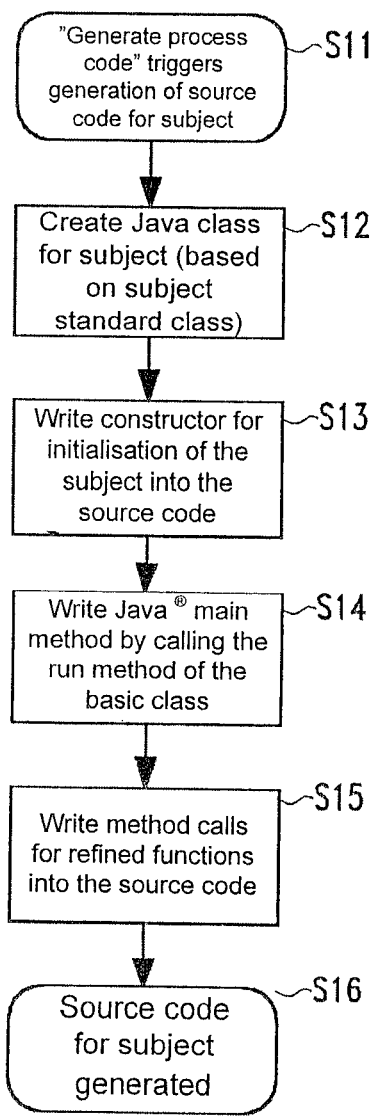
Figure 4:
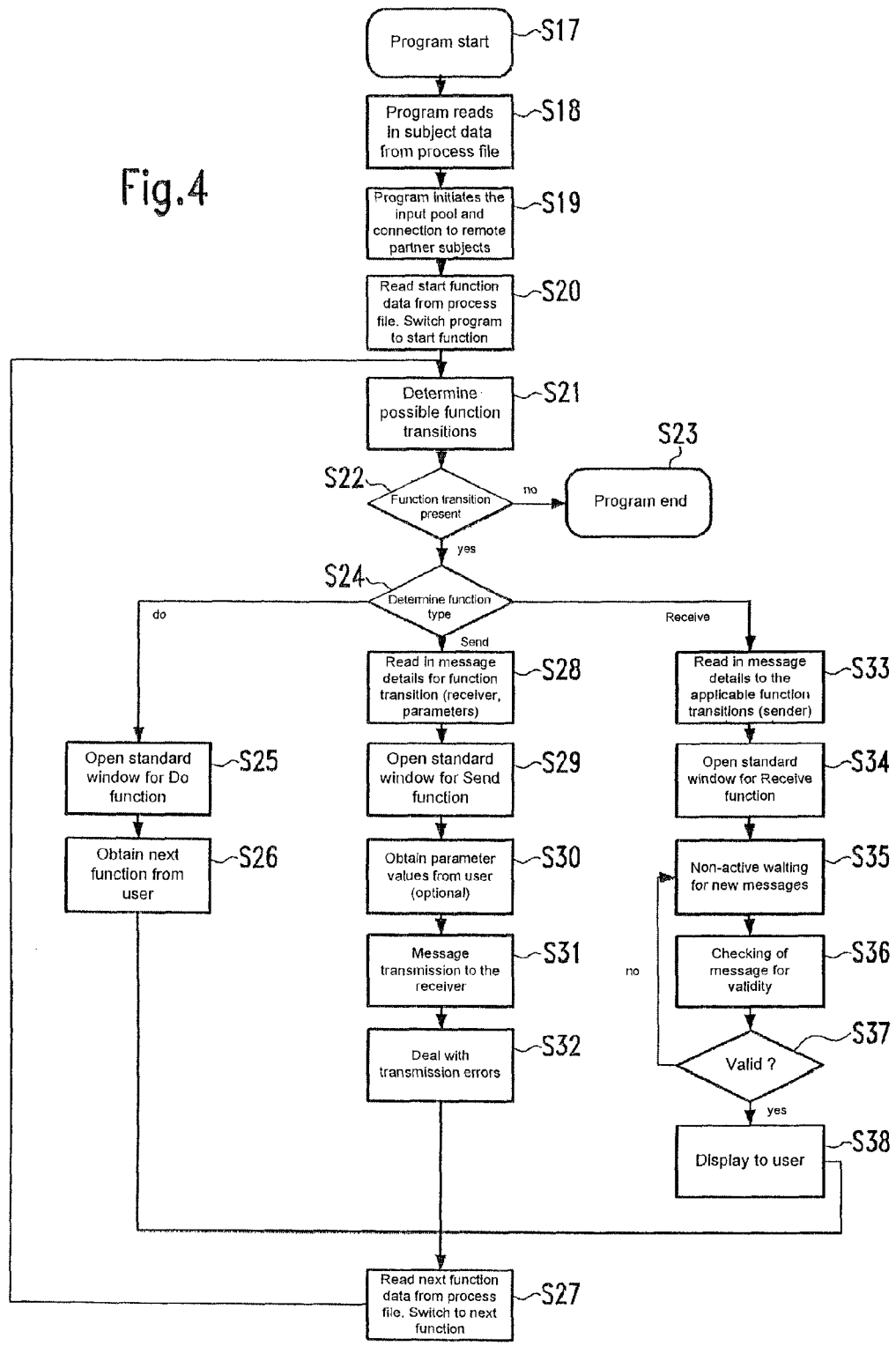
Figure 6:
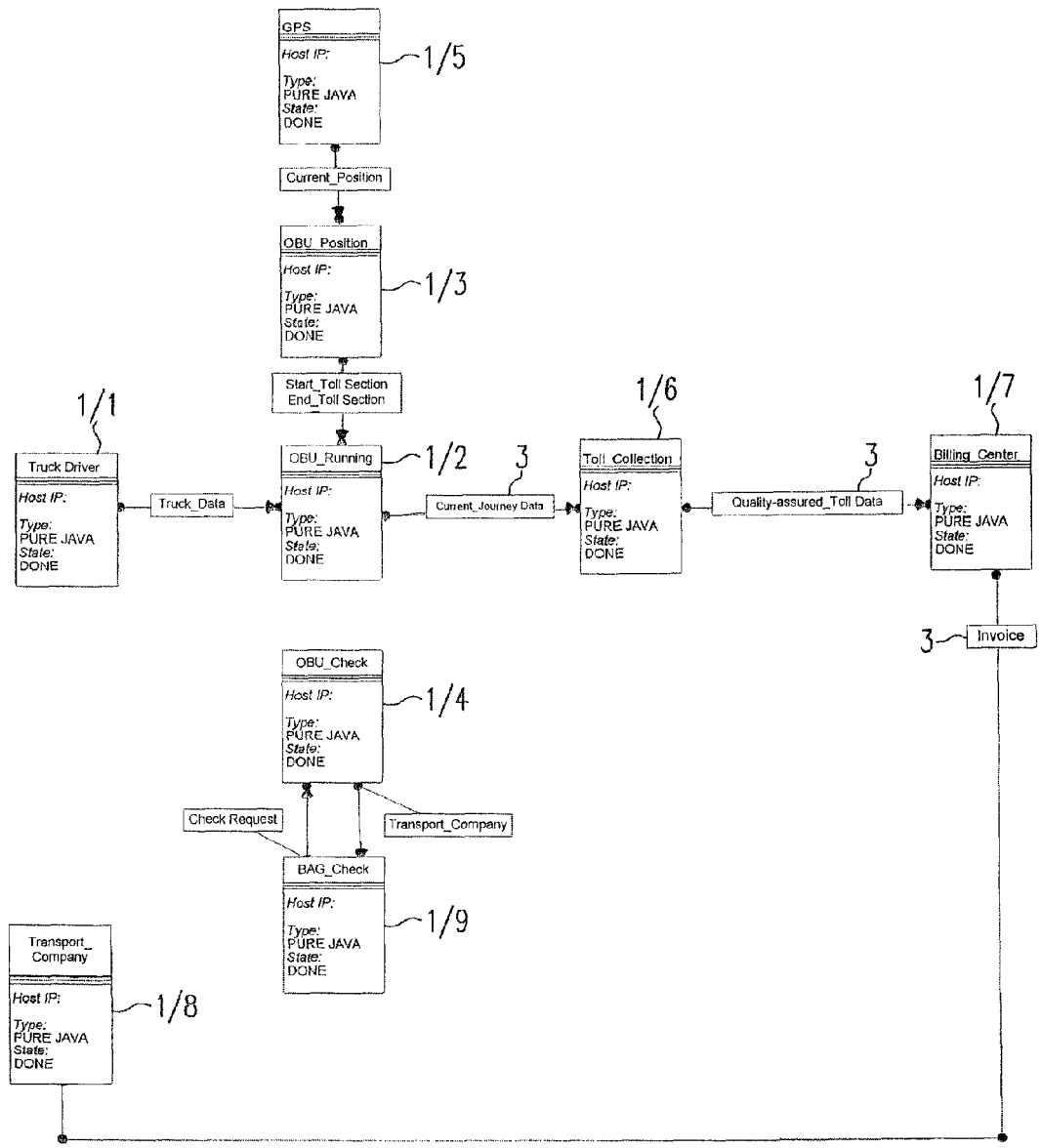
Figure 8:
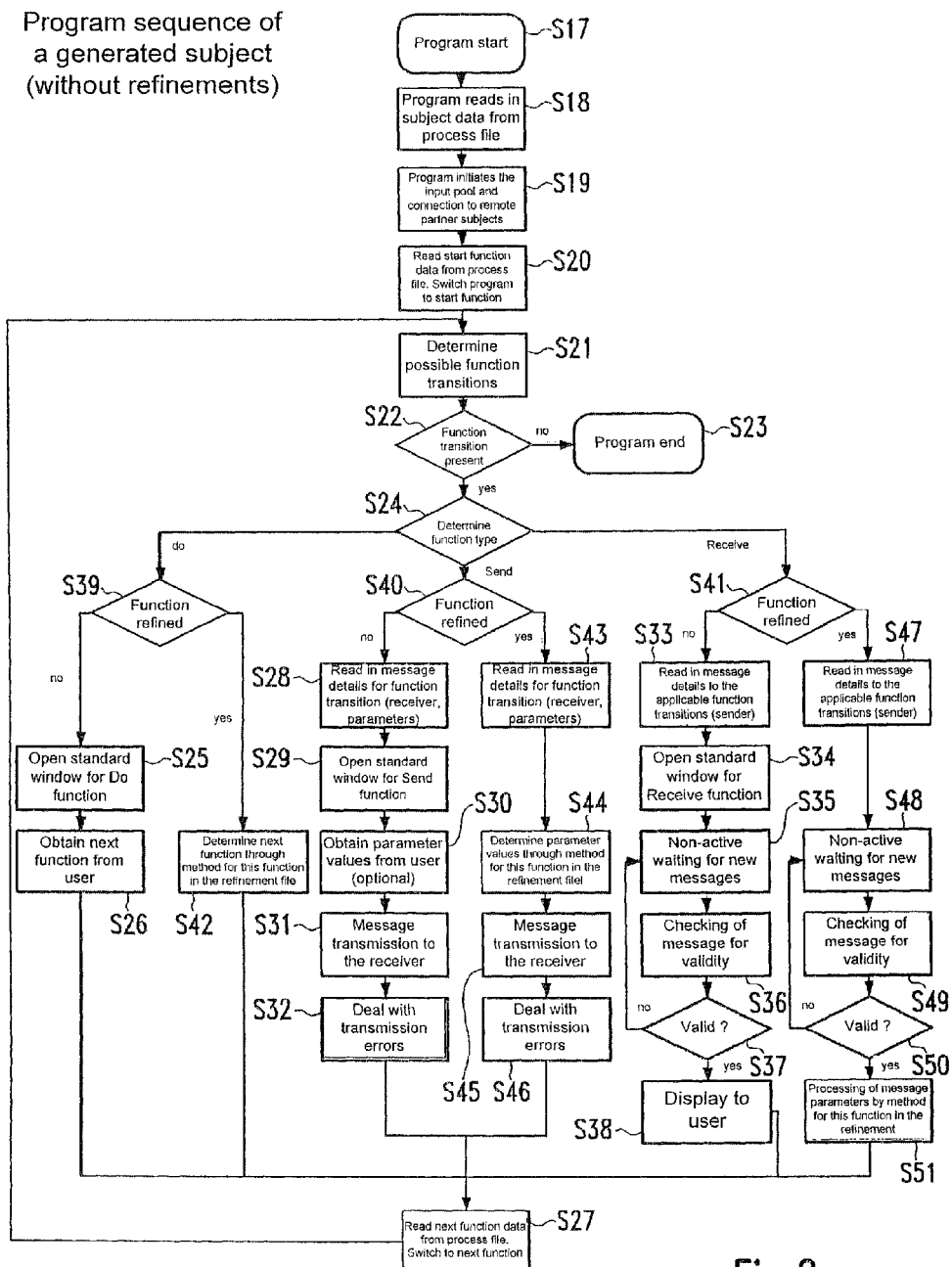
Figure 9:
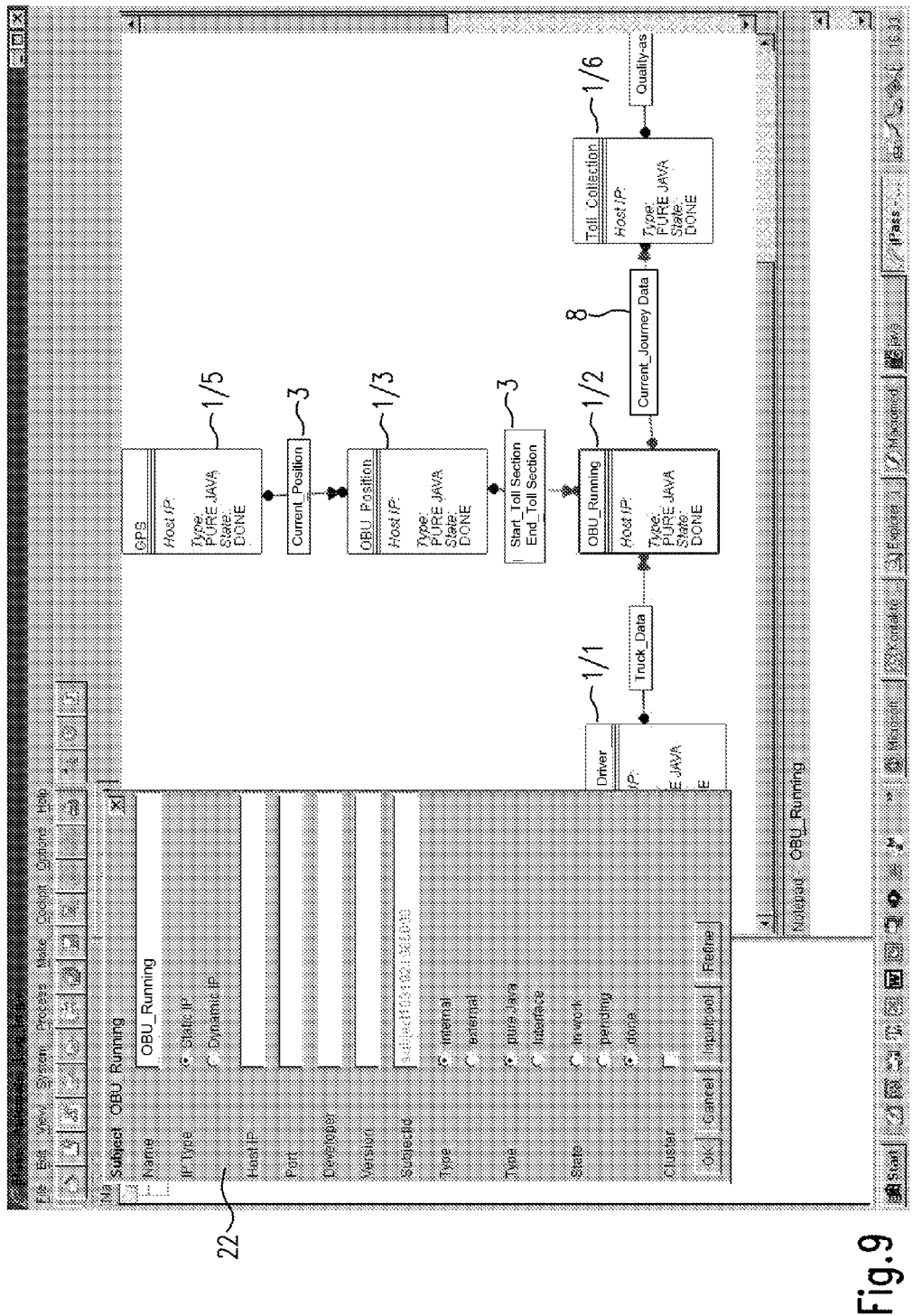
Figure 10:
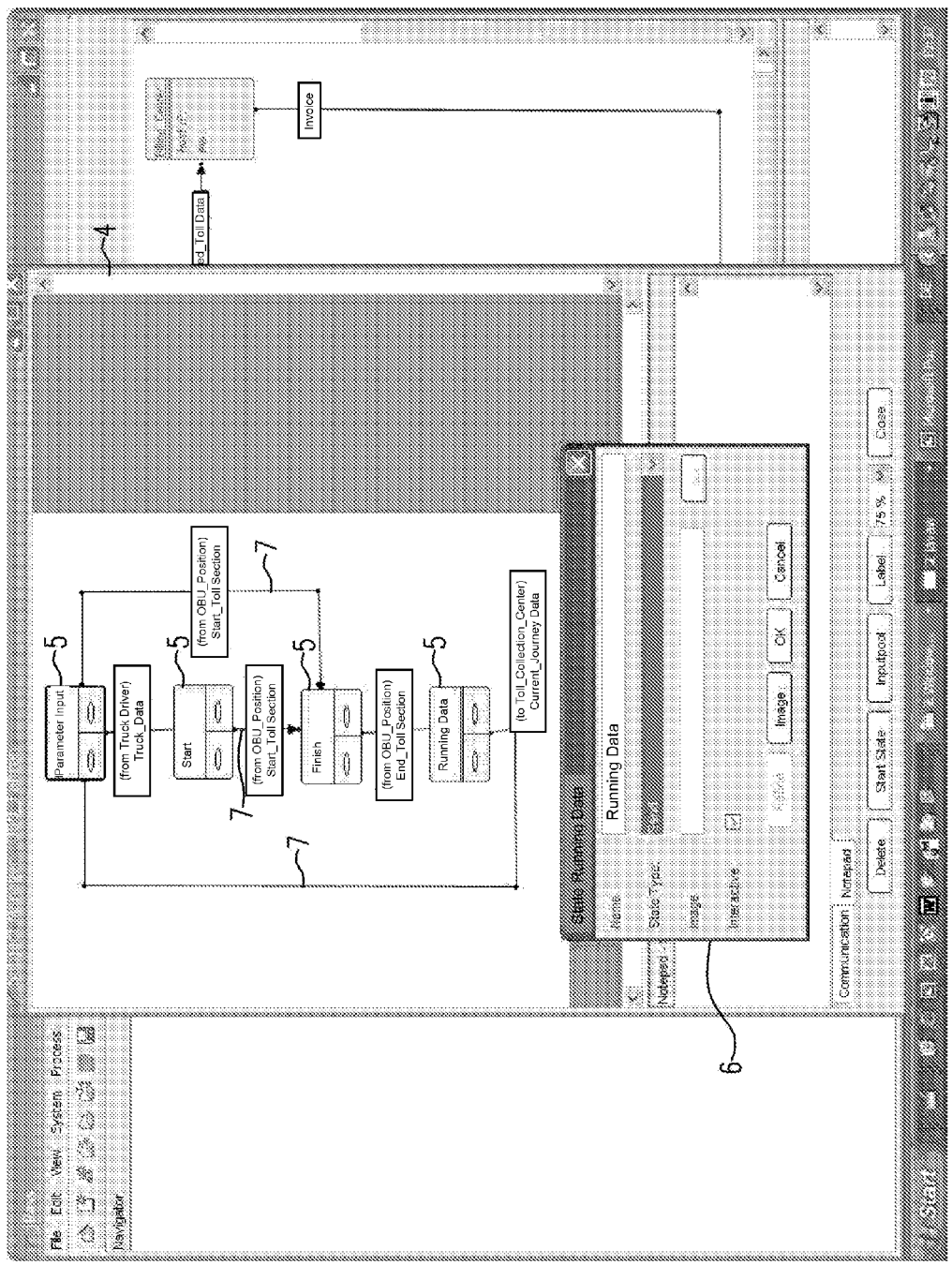
Figure 11:
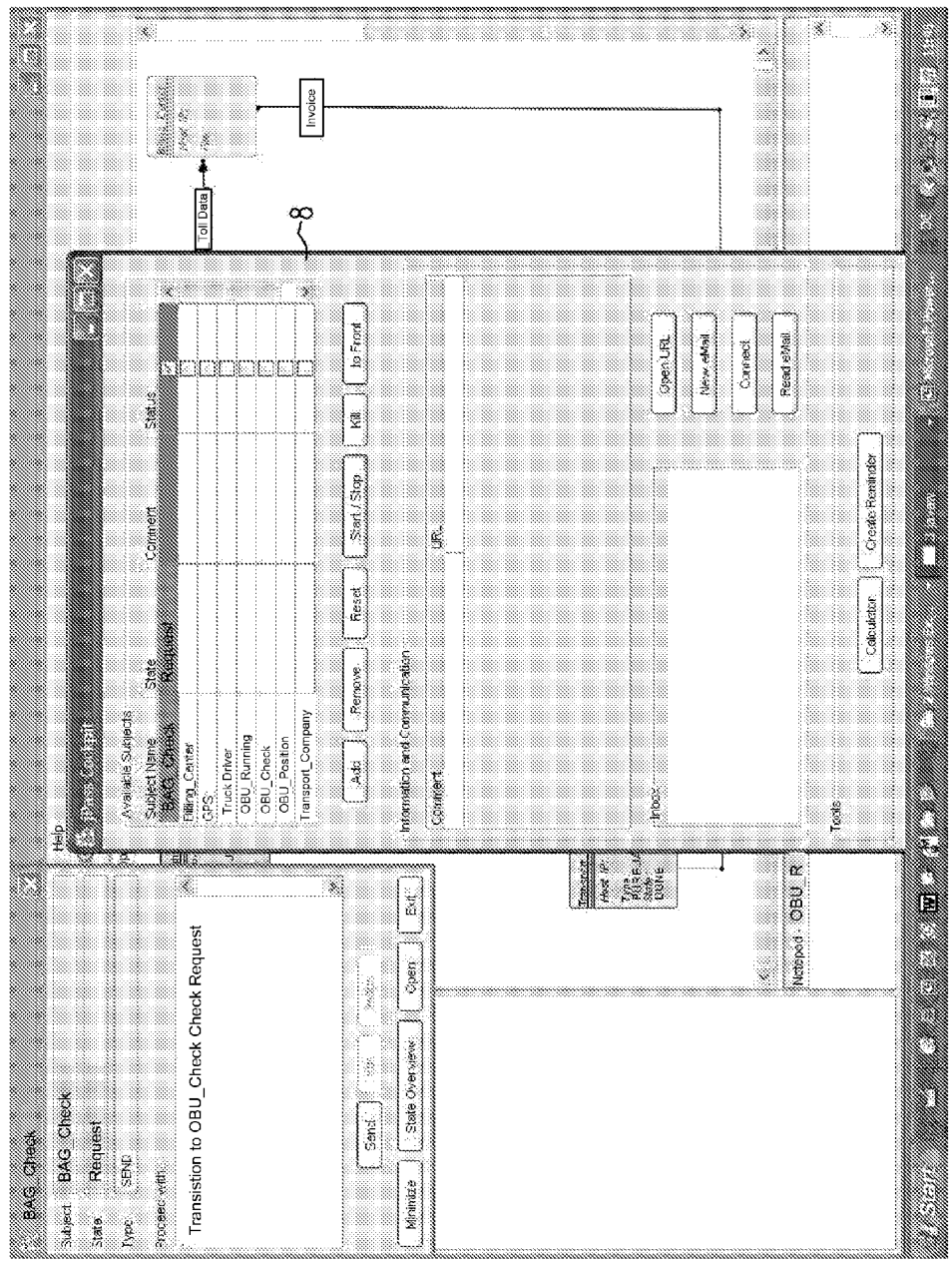
Figure 12:
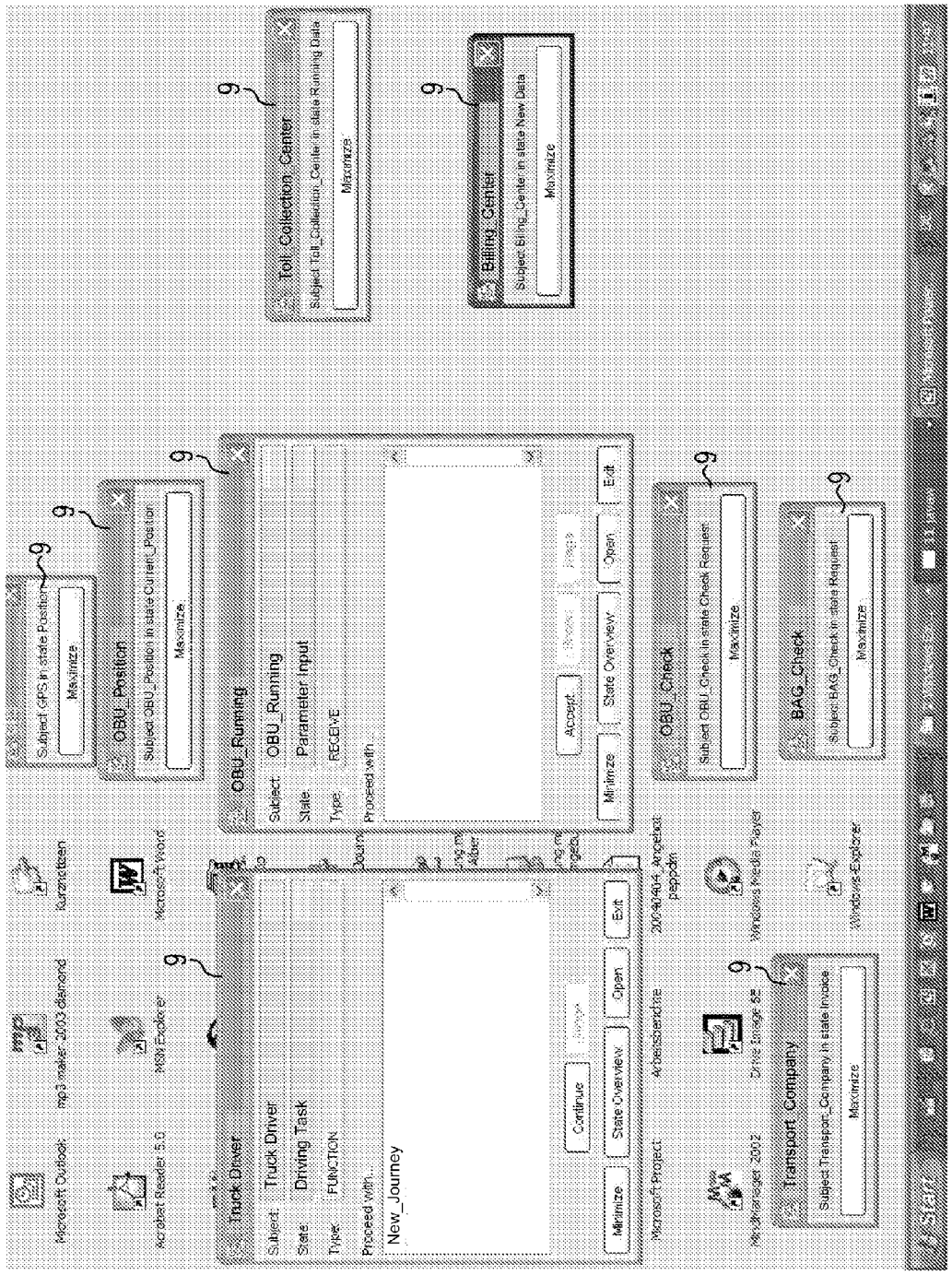
Figure 13:
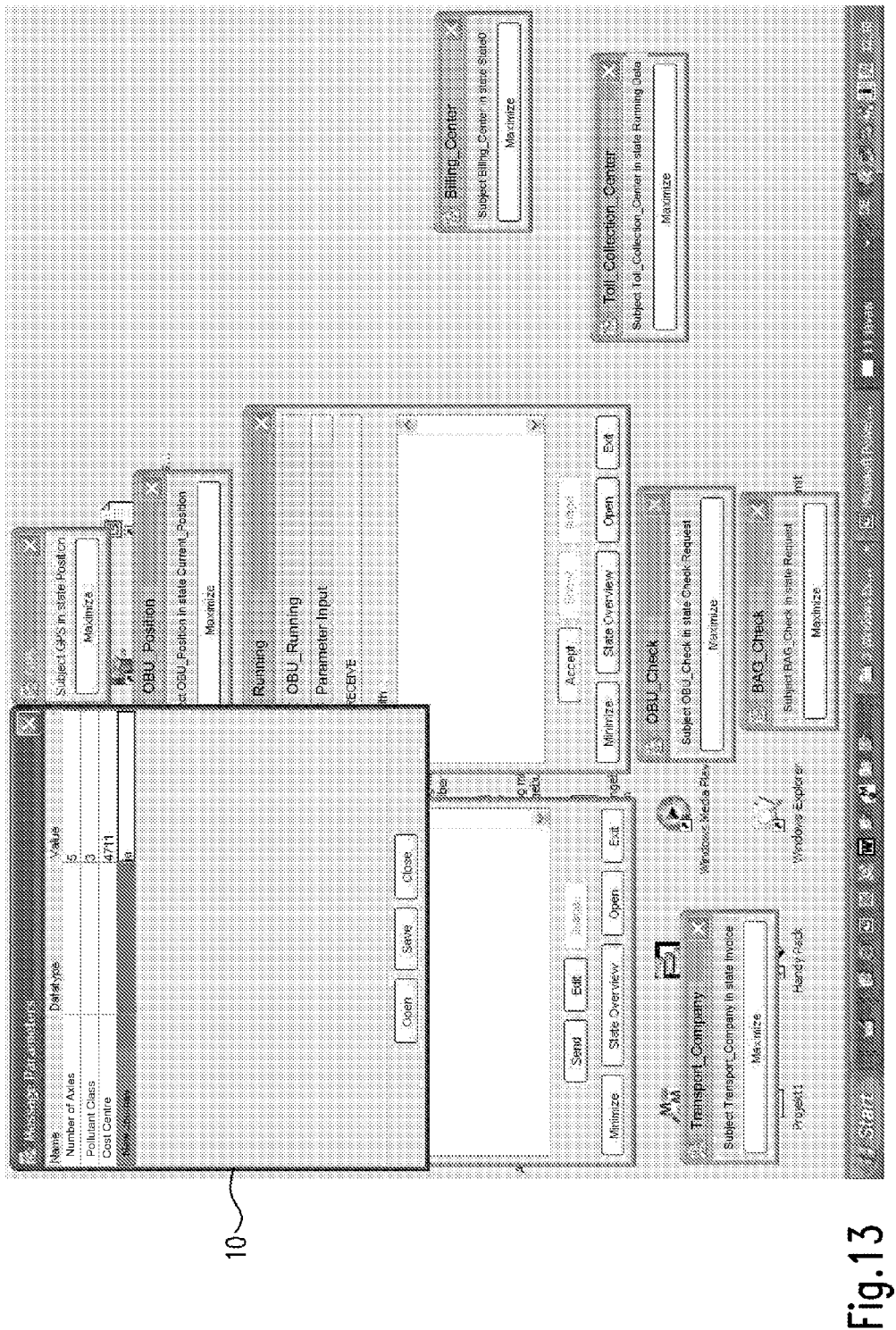
Figure 14:
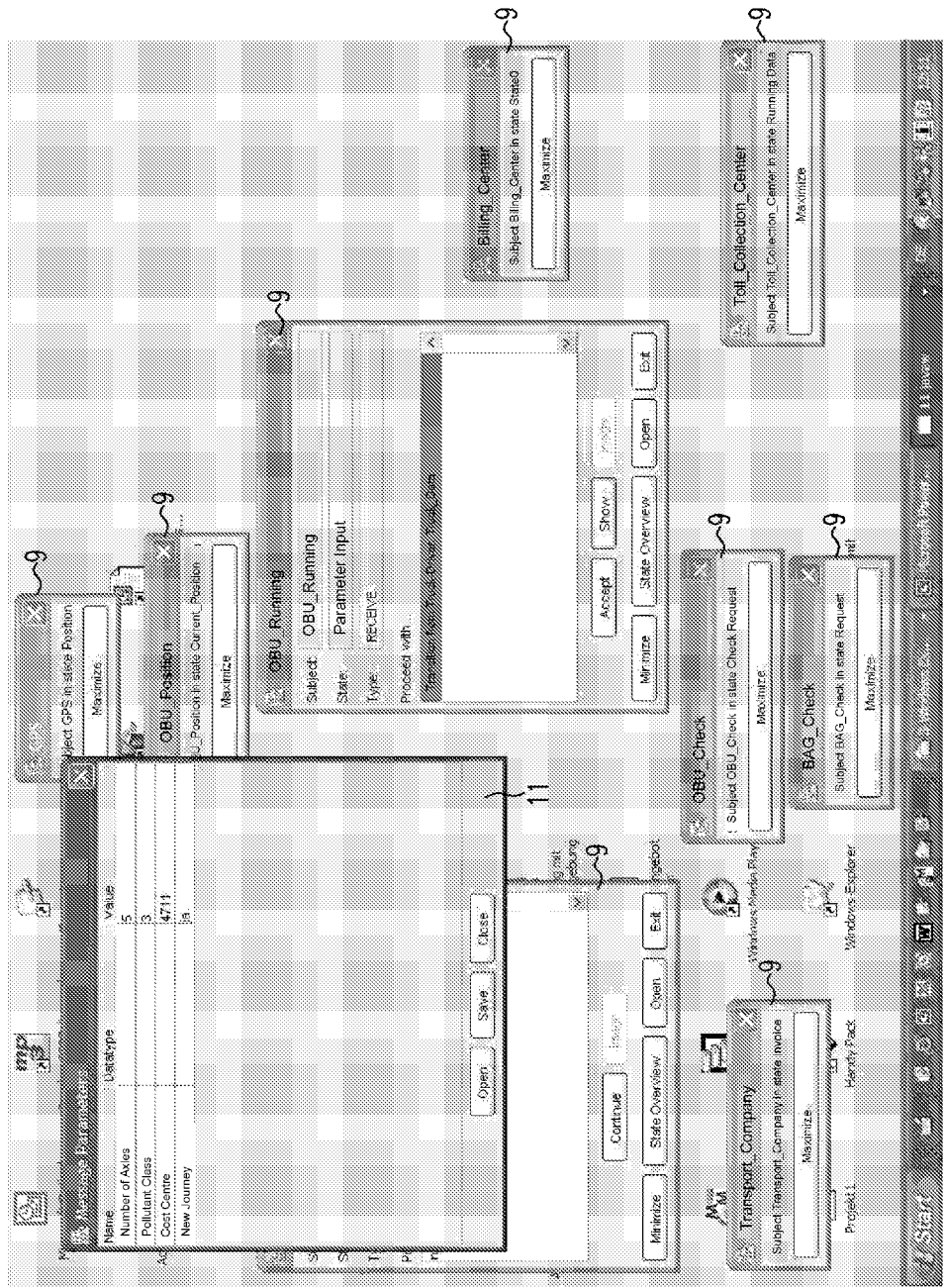
Figure 15:
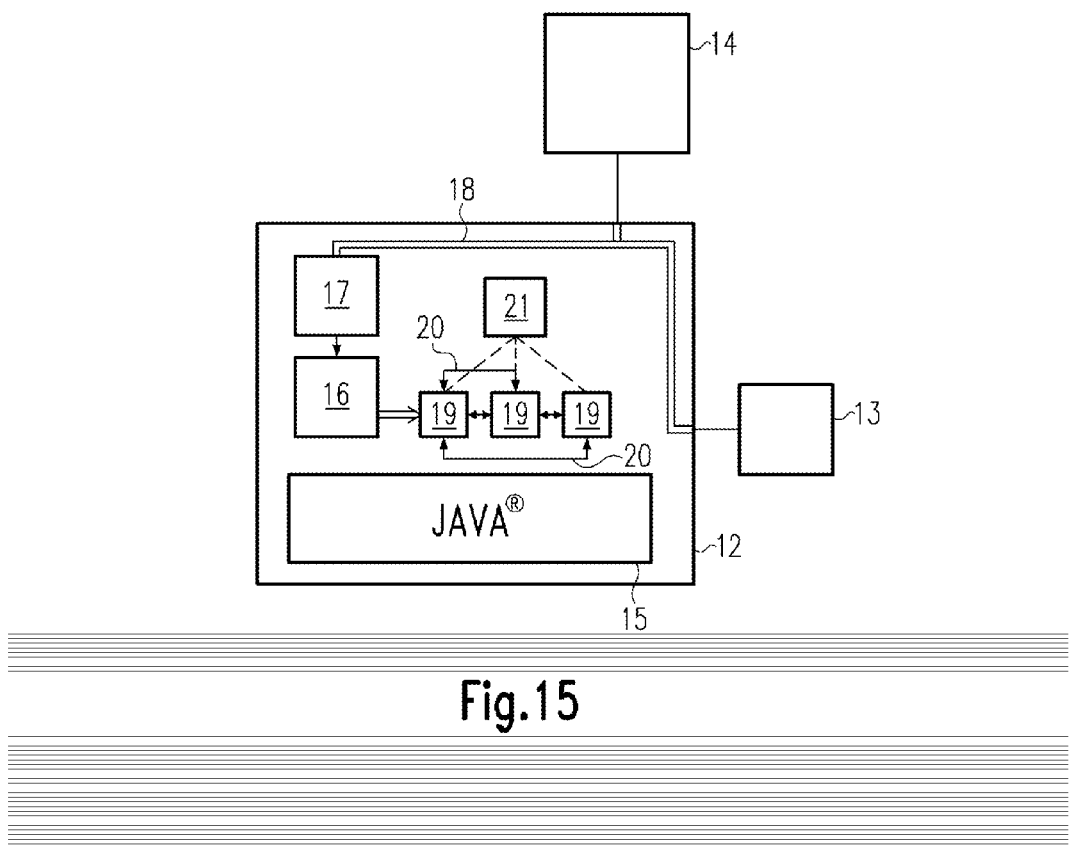
Figure 16:
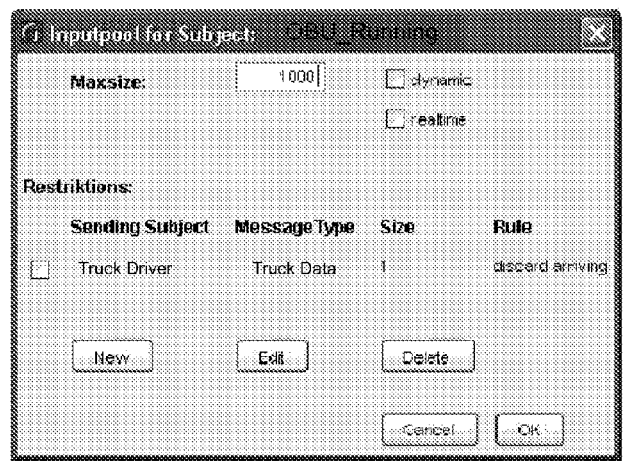
Figure 17:
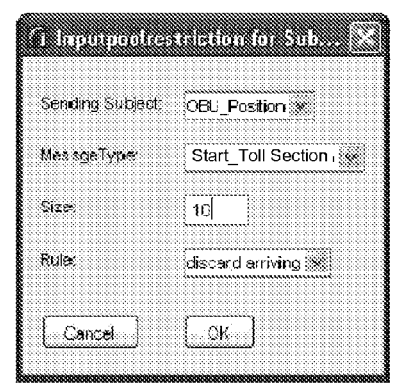

The invention is explained below by way of example with the aid of the drawings, which show in:

FIG. 1 schematically in a flow chart, the validation of generating a processor code for a subject from a process file input earlier, FIG. 2 schematically in a flow chart, the partial steps of the step "generate source code" shown in FIG. 1, FIG. 3 schematically in a flow chart, the partial steps of the step "generate source code for subject" shown in FIG. 2, FIG. 4 the sequence of an automatically generated source code for a subject, in which the source code contains no refinements, FIG. 5 the structure of a process file, FIG. 6 a process diagram of a typical process, FIG. 7 a detail of a process file, showing the data for the subject OBU_Running (onboard unit), FIG. 8 the sequence of an automatically generated source code to which manually programmed program sections (refinements) have been added, in a flow chart, FIG. 9 a screen display of a process manager for inputting a process, FIG. 10 a screen display of a subject manager for inputting the functions of a subject, FIG. 11 a screen display showing a window for calling up the individual source codes for their validation, FIG. 12, FIG. 13 and FIG. 14 in each case screen displays showing the validation process under different conditions, FIG. 15 schematically in a block diagram, a system for execution of the method according to the invention, FIG. 16, FIG. 17 a screen display in each case of a window for the input of input pool definitions.

In the method according to the invention, a process represented in a process file is automatically converted into a source code for a computer program. The process may be of a technical or a business management nature, or may comprise both technical and business management components. An important feature of the invention is that, in the process, individual participants may be specified, which may be real persons or also specific devices or parts of devices or other stations in the process, which communicate either with other participants and/or actions. These participants will subsequently be described as subjects.

To explain the invention, FIG. 6 shows in a diagram a simplified process for the automatic collection of truck tolls on German motorways. The method according to the invention is however provided for much more complex processes.

The process illustrated in FIG. 6 comprises nine subjects 1, each represented by a rectangular box. In the first line of each box of the subjects 1, the name of the subject is shown. The subjects are: Truck Driver, GPS, OBU_Position, OBU_Running, OBU_Check, Toll_Collection_Center, Billing_Center, BAG_Check and Transport_Company.

The subject Truck Driver represents the real person of the truck driver who, for the collection of the truck toll, has to enter the data for his truck, such as e.g. axle number, pollutant class, cost centre, into a so-called onboard unit (OBU). In this process the onboard unit is represented by three subjects, namely OBU_Running 1/2, OBU_Position 1/3 and OBU_Check 1/4. The subject OBU_Position is linked to the subject GPS1/5, which represents a GPS receiver for detecting the current position of the truck. From the current position of the subject GPS1/5, the subject OBU_Position 1/3 generates a message that the chargeable toll section is starting (Start_Toll Section) or ending (End_Toll Section), which is sent to the subject OBU_Running 1/2. After the vehicle has driven over the complete toll section, the subject OBU_Running 1/2 sends the current running data to the subject Toll_Collection_Center 1/6, representing the headquarters of the company charged with collection of tolls. Here a quality check of the received data is made, in particular plausibility checks, to reveal any misuse. The toll data, quality-checked in this way, are passed on by the subject Toll_Collection_Center 1/6 to the subject Billing_Center 1/7. The subject Billing_Center 1/7 generates an invoice, which it sends to the transport company, represented in this process by the subject Transport_Company 1/8. Trucks on a toll motorway are monitored by the Federal Motorway Authority, by means of a vehicle of the Authority driving alongside a truck, establishing radio communication with the onboard unit, and interrogating its status and data. This monitoring unit is represented in a diagram for the subject BAG_Check, which is able to communicate with the subject OBU_Check 1/4, which is part of the onboard unit.

The generation of such a diagram is assisted by a process manager (FIG. 9) which, with a double-click on one key of the computer mouse provides a function "new subject" which, when called up generates a new subject 1, while in an additional window 22 the user may enter a number of parameters, such as e.g. the name of the subject. If the user has entered the relevant parameters, he can then move the subject on screen to any desired point, using the computer mouse. Communication between the individual subjects is initiated simply by drawing an arrow 2 from one subject to another subject, with firstly the subject 1 from which the message is sent being clicked on by simultaneously pressing two buttons of the computer mouse, and the mouse pointer then being moved to the subject receiving the message. If now one mouse button is clicked, the relevant arrow is drawn automatically between the two subjects and a small box 3 is opened, in which the user has to enter the name of the message, e.g. Truck_Data or Current_Running Data (FIGS. 6, 9).

By double-clicking on a subject, a subject manager 4 (FIG. 10: Subject manager for OBU_Running) is started, showing in a window individual functions 5 to be executed by a specific subject. These functions 5 may be entered and edited in this window. These functions 5 are solely SEND, RECEIVE and DO. By double-clicking, a new function is introduced and a corresponding window 4 is displayed. At the same time a corresponding input window 6 opens, in which the name of the function, the type of function and other parameters may be specified. In FIG. 11, the relevant input window 6 for the function Running Data is opened, with this function 5 being a SEND function, as indicated by "send" under "state type". The other functions 5 shown here, "Parameter Input", "Start" and "Finish" are RECEIVE functions. The communication between the individual functions may again be represented by arrows 7 as in the process diagram. In each case a small box is opened in which, for SEND functions the name and the receiver of the message to be transmitted are entered, and for RECEIVE functions the name of the relevant sender and the message for which the RECEIVE function is waiting are entered. It is also possible for a RECEIVE function to receive messages from different senders, e.g. the function "Parameter Input", which may receive both the Truck_Data from the truck driver and also the message Start_Toll Section from the OBU_Position.

By actuating the button "Input pool" in the subject manager, a window for entering input pool definitions is opened (FIG. 16). The input pool is preset for a receiving capacity of 1000 messages (default value). This window may be used to set the maximum number of receivable messages.

By actuating the button "New", another window (FIG. 17) is opened for the entering of input pool restrictions. Here a receiving capacity may be reserved for each sender (here: Truck Driver or OBU_Position) or for each message type (Truck_Data or Start_Toll Section). This is done by entering in the fields "Sending Subject" and where applicable "Message Type", the sender or message type and the number of messages reserved in the input pool for this sender or message type. In this connection it is important that different numbers of receivable messages may be specified simultaneously in an input pool for different senders or different message types. By this means a separate receiving capacity is reserved in the input pool for each sender and for each message type. These receiving capacities thus form partitions of the input pool which are independent of one another. By this means it is ensured that a specific sender can not fill up the input pool completely on its own, but instead specific senders and specific message types have a predetermined partition irrespective of the message volume from other senders.

It is also possible to specify in the field "Rule" how new messages for a partition should be dealt with if this partition is full. "Blocked" is entered as a preset value, i.e. new messages are not accepted when this partition is full. Alternatively the values "discard arriving", "replace newest" or "replace oldest" may be entered. With "discard arriving", the incoming messages are deleted when the partition is full. With "replace oldest", the respectively oldest message in this partition is replaced by the new message, when the partition is full. With "replace newest", the respectively newest message in this partition is replaced by the new message, when the partition is full.

For each subject, the subject manager may be used to specify in a suitable manner the functions to be performed in the subject. The complete subject diagram for the subject OBU-Running is shown in the subject manager in FIG. 10.

In generating the process diagram and the individual subject diagrams, a process file in a meta language is generated automatically.

FIG. 7 shows a detail of the process file for the example of automatic toll collection. This process file has the name "Automatic_Log_in.jpp". This file contains the data on the subject OBU_Running. In the process file, a corresponding record is provided for each subject. Such a record comprises the name of the subject ("OBU_Running), a subject number ("subject 1081921986090"), details of the computer on which the subject is to be executed, with static or dynamic IP address, where applicable the IP address of the server), optional details such as the name of the developer and the version. In addition the subject may be of internal or external type. Here, a subject of internal type means that it is the subject of the process with which it communicates, while a subject of external type means that from another process a data link is made to this subject, to which the subject does not belong.

The external subject may be part of another process which in turn comprises several subjects which communicate with one another. With such an external subject it is therefore possible to link several existing processes together.

If a specific process communicates with another process, it is also possible in the context of simulation for the other process to be simulated only by a single external subject. I.e. of the other process, only the external subject exists. For the process which communicates with the other process, this external subject simulates the communication to and from the other process, by which means, for the original process, the other process is simulated solely by a single external subject. This makes it possible to simulate the communication between different processes without having to create all processes in full.

Moreover the type of subject may be identified as being capable of running independently (pure Java®) or as incapable of running independently (interface). If the subject is unable to run independently, then an interface is generated which may be used by other programs to communicate with the subject.

A subject may be part of a cluster, e.g. in a process involving several onboard units. Here the subject OBU_Running is created once and copied several times, with all subjects OBU_ Running then forming a cluster.

In addition the messages to be sent are defined by specification of the message receiver, by the name of the message, and by the names of the parameters containing the individual message, of which data type and data content may be specified optionally. For each subject an input buffer and its size are determined. The input buffer is described as the input pool and has a standard size of 1000 messages.

In the process file, the individual functions of the subjects (FIGS. 7, 10: running data, parameter input, start and finish) are listed as states with their type description (SEND, RECEIVE, DO), together with details of whether, when this function is called up, a particular image from a particular image source should be displayed. One of the functions (in FIG. 7: parameter input) is specified in the process file as start function, i.e. this function is the first function to be executed when the subject is called up. The provision of a start function makes it possible, in editing the functions of a subject, to change the start of execution from one function to another function easily. For this it is necessary only to click on the relevant function in the subject manager and the command "Start State" (see FIG. 10, bottom) is activated.

FIG. 5 shows in a simplified schematic form the make-up of such a process file for two subjects, subject 1 and subject 2, each of which has two functions, namely function 1.1 and function 1.2, and function 2.1 and function 2.2 respectively. The functions 1.1 and 2.2 are of the type RECEIVE, and the functions 1.2 and 2.1 are of the type SEND. With these functions, the messages message 1 and message 2 are exchanged.

The method according to the invention will be explained below by means of an example in which a source code is generated in the Java® programming language. A user may start the process with the command "Make Classes" (step S1 in FIG. 1). This is followed by step S2 in which a method for the generation of a source code, explained in detail below, is called up.

The generated source code is compiled in a processor code (S3). When the processor code for a subject is available, then this process section is finished (S4).

According to the invention, a separate source code is generated for each subject. In this way, very complex processes are broken down into individual sub-processes for which a source code may be easily generated.

With the aid of FIG. 2, process step S2 (generate source code) will now be explained in detail. The method "generate source code" may be started either by calling up in the method "generate processor code" (S5a) or by the user calling up the command "Make Sources" (S5b). In step S6, the method "generate source code for subject" is called up, to generate the source code for a subject. This method is explained in detail below. The subsequent steps S7 and S8 in FIG. 2 are optional. S7 deals with the generation of a source code for a refinement interface, and S8 with the source code for a refinement. Refinements are manually programmed program sections which are added to the automatically generated program sections. For this purpose an interface is provided (S7) for linking the manually generated program section to the automatically generated program section.

In step S9 the process file or a copy of it is stored to the respective subject for which the source code is generated. This terminates the process for generation of the source code (S10).

The individual process steps of the method "generate source code for subject" are shown in FIG. 3. This method begins with step S11.

In step S12, a Java® class for a subject is created. Passed on to this Java® class are the methods of a pre-programmed standard class, supplemented by a number of methods. This class is designated as the "subject" and is shown in Appendix A.

In step S13, a source code file is initialized, i.e. a method for initialization of the class is written into the source code. This method is described in Java® as the constructor. The process file name and the subject ID are entered in this constructor.

In step S14, the Java® method "main" is entered in the source code. This "main" method contains a call of a run method which has been inherited from the class shown in Appendix A. Optionally, method calls for refinement functions may also be written into the source code (S15). This process section is ended by step S16.

Next, the program sequence for calling up the automatically generated source code for a subject without refinements, as described above, will be explained with the aid of the flow chart of FIG. 4. The program is started by step S17. In step S18, subject data are read from the process file.

In step S19, an input pool and links to remote partner subjects are initialized. The input pool is a buffer memory. This buffer memory is created for each subject and is used to receive data. The initialization of the links to partner subjects is effected by creating a remote subject for the relevant subject, which is used only for the sending of data to another specific subject. The remote subject therefore writes data to be transmitted into the input pool of another subject.

All subsequent process steps are executed by the method "run" described above.

In step S20, the data of the start function are first of all read from the process file, and the program is set to the start function. In step S21, possible function transitions to other functions are determined. In an inquiry (S22) a check is made as to whether or not such function transitions exist. If no function transitions are present, the program is ended (S23). If function transitions are present, then in inquiry S24, the function type is determined. There are only three function types, namely DO, SEND and RECEIVE. If the function is a DO function, then the process sequence moves on to step S25. In S25, a standard window for the DO function is opened. In this standard window the user, if several function transitions exist, is asked which function should follow (S26). By this means, therefore, handling of the subject is replaced by a request to and a decision by the user.

From step S26 the process sequence moves on to step S27, in which the data of the next function are read from the process file and the program is switched to the next function. The process sequence then reverts to step S21.

If the inquiry in step S24 revealed that the function is a SEND function, then in step S28 the data for transmission of the message, namely the name of the message, the receiver and optional parameters are read in from the process file.

In step S29, a standard window for the SEND function is opened.

The optional step S30 may be used to obtain from the user parameter values which are to be transmitted with the message. In step S31, the messages are transmitted to the receiver, i.e. they are passed on from the subject to the remote subject which writes the data into the input pool of the receiver.

In step S32 any transmission faults which occur are dealt with. Transmission faults are also dealt with to some extent in the remote subject.

Here the process sequence returns once more to step S27, in which the data of the next function are read from the process file, and the program is switched to this function.

If the inquiry in step S24 reveals that the function is a RECEIVE function, then the process sequence moves on to step S33. In Step S33, the data belonging to the current message, namely the name of the sender, are read in according to the applicable function transition.

A standard window for the RECEIVE function is then opened (S34).

In step S35, non-active waiting for the relevant message is initiated. The non-active waiting is based on the so-called monitor concept, described in October 1974 by C.A.R. Hoare in the article "Monitors: an operating system structuring concept" in Commun. ACM 17,10. In simplified terms, this monitor concept may be described as a shifting of the waiting function from the program plane into the operating system plane or the processor plane. The important thing is that this monitor concept prevents a multiplicity of tasks from being active simultaneously in a multitasking system, with repeated demands on processor capacity to execute the waiting. Through the monitor concept, the waiting for a multitude of tasks is monitored by just a single operating system task. In a simple manner, this monitor concept allows a multiplicity of programs and/or tasks to run in parallel and to wait for data from another task or another program, without significantly impairing processor capacity. In Java® the monitor concept is implemented by the methods "notify", "notifyAll" and "wait". These methods are also called up by the "run" method referred to earlier.

After receipt of a message, it is read out of the input pool in step S36, and then checked for its validity (S37). If the message is not valid, then the process sequence reverts to step S35. If the message is valid, then it is displayed to the user in the window already opened (S38).

The process sequence then returns to step S27, in which the data of the next function are read out from the process file, and the program is switched to the next function.

As an option it is also possible, if a subject is able to receive several different messages, to display all messages received in step S38. In this connection, however, it is expedient that the process sequence moves to step S27 only after the user has acknowledged one of the messages received and displayed, since otherwise no more messages can be received in the one RECEIVE function after receipt of the first message. Otherwise it would be necessary to provide several RECEIVE functions for this purpose.

FIG. 8 shows the sequence of an automatically generated source code to which manually programmed program sections, described as refinements, have been added. This program sequence corresponds substantially to that of FIG. 4, with identical process steps bearing the same reference numbers. To avoid repetition, these process steps are not explained. The method of FIG. 8 differs from that of FIG. 4 in that, after the inquiry as to function type in step S24, in each case a further inquiry (S39, S40, S41) is made, in which it is determined if the function has been refined, i.e. whether refinements have been added to it.

If the function is of type DO, and there are refinements present, then the process sequence moves on to step S42, which specifies, at least automatically, the transition to the next function. In this step it is also possible to call up a predetermined program. In this connection, in particular programs from ready-made libraries may be incorporated in the process, and are then executed. The method according to the invention may thus be combined with existing program libraries which are already available for many applications. Typical applications are for example the management and interrogation of databases.

If the function is of type SEND, and there are refinements present, then the process sequence moves on to step S43, which is identical to step S28 described above, in which the data for transmission of the message, i.e. the name of the message, the receiver, and optional parameters, are read in from the process file.

In step S44, parameter values which are to be transmitted with the message are read in by a method from a refinement file. The messages are then transmitted to the receiver (S45), and any errors are dealt with (S46). The process sequence then returns to step S27.

If the function is of type RECEIVE, and there are refinements present, then the process sequence goes to step S47, which corresponds to step S33 described above, in which data of the current message, namely the name of the sender corresponding to the relevant function transition, are read in. The next steps S48, S49 and S50 correspond to steps S35, S36 and S37 described above, and provide for automatic receipt and checking of validity of the message concerned. In step S51 a method, determined by the refinement file, for processing the received messages is called up. The process sequence then reverts to step S27.

With the aid of FIGS. 11 to 14, the validation of the source code generated in accordance with the method according to the invention is explained below. To execute the validation process, a separate validation program (FIG. 11) called "jPass Cockpit", is provided. In FIG. 11 a window 8 of the validation program is open. Using this validation program, the source codes of the individual subjects may be initiated, stopped, reset and cancelled. A validation program of this kind is not essential to carry out the validation process. However it simplifies the initiation of different source codes, which may also be described as different sub-programs.

Since in this validation program the separate subjects may be selected individually, it is possible to initiate and validate only part of a process.

When the source codes of the subjects have been initiated, a window 9 is opened for each subject, with the name of the subject shown at the top. In FIG. 12 the windows of all subjects of the process shown in FIG. 6 are open, i.e. all source codes have been initiated. The name of the subject is shown in each case in the topmost bar of the window. In principle the windows are minimized. In FIG. 12 the windows are GPS, OBU_Position, Toll_Collection_Center, Billing_Center, OBU_Check, BAG_Check and Transport_Company. Also shown in these windows is what function is being executed currently by the subject concerned. Thus the subject Toll_Collection_Center will execute the function "RUNNING DATA". This is a function of the type RECEIVE, under which the transmission of running data is awaited. In each of the minimized windows is a "maximizer" button which is actuated by the mouse in order to maximize the window display. The windows of the subjects Truck Driver and OBU_Running are shown in maximized form.

When a subject sends or receives a message, the relevant window is maximized automatically.

In the status of the system in FIG. 12, the user is asked in the window Truck Driver whether a new_journey is to be made. If he confirms this by the button 'continue', then in the subject Truck Driver the next function is executed, in which the user is called upon to enter the relevant data, e.g. axle number, pollutant class, cost centre, and a logical value for the new journey. When the entry is complete, the message is automatically sent to the subject OBU_Running, and displayed in the relevant window as "transition from Truck Driver: Truck_Data". Using the button "show", another window 11 may be opened to display the message. With the button "accept", the message may be accepted, whereupon in the subject OBU_Running, the function parameter input switches to the function Start (see FIG. 10), since the Truck_Data have been received from the Truck Driver. If the subject OBU_Running has received the message Start_Toll Section from the subject OBU_Position, then the function sequence would go to the function Finish, to await the end of the toll section, before the running data are send to the Toll_Collection_Center by the function Running Data.

With this validation process, the origin, where applicable the content, and the passing on of the individual messages may thus be tracked. The validation of the automatic generated source code files may be executed immediately following the automatic generation of the source code without the need for additional manual insertion of a program code. This is a significant benefit of the method according to the invention, based on the fact that, on the one hand, communication between the individual subjects is generated completely automatically, while on the other hand the activity of the individual subjects (function DO) is replaced by an inquiry to the user, if there are not already available program elements from libraries, which are incorporated automatically.

The invention thus permits the generation of a program structure, which may be automatically generated and validated, for very complex processes with several hundreds or thousands of subjects, which may then be supplemented as required by manually compiled programs or by programs which are already available.

FIG. 15 shows a system for the execution of the method according to the invention. The system comprises a computer system 12 which, for the purposes of the present invention may be an individual computer or a network comprising a multiplicity of computers. The computer system 12 has one or more input devices 13 comprising a keyboard and a computer mouse, together with an output device 14. The output device is typically a monitor or a beamer. A Java® platform 15 is provided in the computer system 12.

The method according to the invention described above is realized through software and computer programs respectively. This software has as its central program a source code generator 16. The source code generator 16 is linked to a program 17 for producing a process diagram, comprising the process manager described above and the subject manager described above. Between the program 17 and the input device 13 and the output device 14 there is a data link 18, via which a user may input the relevant data to produce the process diagram, and the program may output the data to the output device 14 to display the diagram. Preferably the diagram is produced in the form of a block diagram, with a separate block assigned to each subject. Within the scope of the invention, however, it is not necessary for the process file to be generated in graphical form. In principle it would also be possible to write the text of the process file using an editor.

The graphical generation of the process file may however be carried out more easily and in a more intuitive manner.

Once the process file has been generated, it is passed on to the source code generator 16, which generates a source code 19 for each subject. The source codes of each subject are separate programs, which are linked to one another by data connections 20.

The source codes may be initiated individually or all together simultaneously by a validation program 21.

If the system according to the invention is a network with several computers, it is not necessary to have a Java® platform 15 on each computer. Once the source code 19 of a subject has been compiled, it may be executed directly on another computer in the network, on which it has not been generated.

The invention also provides a data carrier on which is stored a computer program which, upon loaded into a computer, executes the methods described herein.

The invention has been explained in detail above with the aid of an embodiment in which the source code is generated in the Java® programming language. The invention is of course not restricted to this programming language. It may also be executed in any other programming language desired. However the use of Java® has the advantage over other programming languages that it may be executed on different computers without dependence on a system so that, if used once on a network, it is easily ensured that the automatically generated source code files may be executed throughout the network.

The present invention provides a tool (method: generate source code) with which a source code is automatically generated. No manual processing of the automatically generated source code is required. The source code may thus be executed immediately.

The invention claimed is:

1. A computer readable storage-type medium, on which is stored a computer program which, on being loaded into a computer, executes a method for the generation of a source code for a computer program for the execution or simulation of a process in which several subjects communicate with one another, comprising the following steps:
    describing the process in which each subject, the communication between the subjects, and the nature of the activity of the individual subjects are defined,
    storing the description of the process with the input definitions in a process file,
    generating automatically by a computer system, a source code for a computer program, in which a separate source code file is generated for each subject and contains commands for the exchange of data with source code files of other subjects, in accordance with the information contained in the process file.

2. A computer readable storage-type medium of claim 1, wherein the source code is generated by a command which, in executing the source code reads data from the process file, and executes certain functions on the basis of this data.

3. A computer readable storage-type medium of claim 1, wherein the automatically generated source code file is generated to call up three different types of function, namely SEND, RECEIVE and DO.

4. A computer readable storage-type medium of claim 2, wherein the automatically generated source code file is generated to call up three different types of function, namely SEND, RECEIVE and DO.

5. A computer readable storage-type medium of claim 1, wherein the source code is provided with a request which requests and calls up functions described in a function sequence in the process file.

6. A computer readable storage-type medium of claim 4, wherein the source code is provided with a request which requests and calls up functions described in a function sequence in the process file.

7. A computer readable storage-type medium of claim 1, wherein the process is described by means of a graphical diagram.

8. A computer readable storage-type medium of claim 6, wherein the process is described by means of a graphical diagram.

9. A computer readable storage-type medium of claim 7, wherein the graphical diagram in the process is described in a meta language.

10. A computer readable storage-type medium of claim 8, wherein the graphical diagram in the process is described in a meta language.

11. A computer readable storage-type medium of claim 7, wherein the graphical diagrams are produced in the form of block diagrams, with each subject being represented by a block, and the communication between subjects represented by arrows between the blocks.

12. A computer readable storage-type medium of claim 10, wherein the graphical diagrams are produced in the form of block diagrams, with each subject being represented by a block, and the communication between subjects represented by arrows between the blocks.

13. A computer readable storage-type medium of claim 1, wherein as commands for the exchange of data, communication commands (RMI: remote method invocation) are used, which are based on the monitor concept, so that active (busy) waiting is avoided.

14. A computer readable storage-type medium of claim 12, wherein as commands for the exchange of data, communication commands (RMI: remote method invocation) are used, which are based on the monitor concept, so that active (busy) waiting is avoided.

15. A computer readable storage-type medium of claim 13, wherein as commands for the transmission of data between the subjects, a "notify" interpreted programming language command, a "notifyAll" interpreted programming language command and a "wait" interpreted programming language command are used.

16. A computer readable storage-type medium of claim 14, wherein as commands for the transmission of data between the subjects, a "notify" interpreted programming language command, a "notifyAll" interpreted programming language command and a "wait" interpreted programming language command are used.

17. A computer readable storage-type medium of claim 1, wherein the source code files are generated in such a way that they may be executed on different computers in a computer network and are able to communicate beyond the computer network.

18. A computer readable storage-type medium of claim 16, wherein the source code files are generated n such a way that they may be executed on different computers in a computer network and are able to communicate beyond the computer network.

19. Method for the generation of a source code for a computer program for the execution or simulation of a process in which a plurality of subjects communicate with one another, the method comprising the following operations:
    producing a description of the process in which each subject, the communication between the subjects, and the nature of the activity of each subject are defined;
    storing the description of the process with input definitions in one or more process files; and generating automatically by a computer system, a source code for a computer program, in which a separate source code file is generated for each subject and contains commands for the exchange of data with source code files of other subjects, in accordance with the information contained in the one or more process files.

20. The method according to claim 19, wherein the source code is generated by a command which, in executing the source code reads data from the process file, and executes certain functions on the basis of this data.

* * * * *